(12) United States Patent
Osiecki et al.

(10) Patent No.: US 8,955,244 B2
(45) Date of Patent: Feb. 17, 2015

(54) SYSTEM AND METHOD FOR MOUNTING A BADGE ON A VEHICLE

(71) Applicant: OXK, LLC, Camillus, NY (US)

(72) Inventors: Scott Osiecki, Skaneateles, NY (US); Donwoong Kang, Camillus, NY (US)

(73) Assignee: OXK, LLC, Camillus, NY (US)

( * ) Notice: Subject to any disclaimer, the term of this patent is extended or adjusted under 35 U.S.C. 154(b) by 0 days.

(21) Appl. No.: 14/215,639

(22) Filed: Mar. 17, 2014

(65) Prior Publication Data
US 2014/0196332 A1 Jul. 17, 2014

Related U.S. Application Data

(63) Continuation of application No. 13/473,216, filed on May 16, 2012, now Pat. No. 8,671,601, which is a continuation of application No. 12/777,591, filed on May 11, 2010, now Pat. No. 8,181,372.

(51) Int. Cl.
*G09F 21/04* (2006.01)
*B60R 13/00* (2006.01)
*G09F 13/08* (2006.01)
(Continued)

(52) U.S. Cl.
CPC .............. *B60R 13/005* (2013.01); *G09F 13/08* (2013.01); *G09F 21/04* (2013.01); *G09F 2007/1865* (2013.01); *G09F 2013/222* (2013.01); *G09F 2013/227* (2013.01); *G09F 7/18* (2013.01)
USPC ................... 40/591; 40/665; 40/643

(58) Field of Classification Search
CPC .............................. G09F 2007/1865

USPC .................... 40/643, 668, 665, 591
See application file for complete search history.

(56) References Cited

U.S. PATENT DOCUMENTS

| 573,870 A | 12/1896 | Geoffroy |
|---|---|---|
| 1,534,223 A | 4/1925 | La Port |
| 1,737,725 A | 12/1929 | Miller |

(Continued)

FOREIGN PATENT DOCUMENTS

| CA | 2266143 | 3/1999 |
|---|---|---|
| WO | 9951462 | 10/1999 |

OTHER PUBLICATIONS

Cho, Jihun, "International Search Report," mailed Nov. 28, 2011 for application No. PCT/US2011/028461, Korean Intellectual Property Office, Daejeon, Republic of Korea.

(Continued)

*Primary Examiner* — Kristina Junge
(74) *Attorney, Agent, or Firm* — Woods Oviatt Gilman LLP; Dennis B. Danella, Esq.

(57) ABSTRACT

A system for mounting a badge to a component of a vehicle is provided. The system comprises a mounting base including a fastening aperture extending in a direction through a plane defined by the mounting base, a trim ring coupled with a peripheral edge of the mounting base and configured to selectively mount the badge between the trim ring and the mounting base when said trim ring is coupled with the peripheral edge, and a flexible fastening member including a first end that is fixedly coupled with the mounting base and a second end that is positioned within the fastening aperture. The flexible fastening member is configured to be positioned around at least a portion of a component of a vehicle and between the mounting base and the badge to fasten the badge to the vehicle.

24 Claims, 9 Drawing Sheets

(51) Int. Cl.
    *G09F 7/18*     (2006.01)
    *G09F 13/22*    (2006.01)

(56) References Cited

U.S. PATENT DOCUMENTS

| | | |
|---|---|---|
| 3,200,524 A | 8/1965 | Hendrickson |
| 4,164,087 A | 8/1979 | Crownover |
| 4,443,832 A | 4/1984 | Kanamori et al. |
| 4,597,206 A | 7/1986 | Benson |
| 4,691,457 A | 9/1987 | Peroni |
| 4,977,695 A | 12/1990 | Armbruster |
| 5,027,537 A | 7/1991 | Freeman et al. |
| 5,428,913 A | 7/1995 | Hillstrom |
| 5,581,852 A | 12/1996 | Zakrajsek |
| 6,106,912 A | 8/2000 | Balog |
| 6,190,026 B1 | 2/2001 | Moore |
| 6,197,390 B1 | 3/2001 | LaVite |
| 6,338,212 B1 | 1/2002 | Santa Cruz et al. |
| 6,581,891 B1 | 6/2003 | Byrd |
| 6,757,998 B1 | 7/2004 | Lucatorto |
| 6,931,708 B1 | 8/2005 | Elwell |
| 6,955,455 B2 | 10/2005 | Schneider |
| 6,986,918 B2 | 1/2006 | Jacobs |
| 7,594,347 B2 | 9/2009 | Anderson |
| 2003/0131513 A1 | 7/2003 | Runge |
| 2003/0209889 A1 | 11/2003 | Erwin et al. |
| 2003/0226299 A1 | 12/2003 | Chou |
| 2004/0163291 A1 | 8/2004 | Pena |
| 2007/0124972 A1 | 6/2007 | Ratcliffe |
| 2008/0028650 A1 | 2/2008 | Ratcliffe |
| 2008/0090031 A1 | 4/2008 | Hirzmann |
| 2009/0000170 A1 | 1/2009 | Capuzzi |
| 2010/0058632 A1 | 3/2010 | Love |
| 2011/0271571 A1 | 11/2011 | Lennard |

OTHER PUBLICATIONS

Cho, Jihun, "Written Opinion of the International Searching Authority", mailed Nov. 28, 2011 for application No. PCT/US2011/028461, Korean Intellectual Property Office, Daejeon, Republic of Korea.

Pictures showing existing badge mounting system, Dec. 5, 2009.

Junge, Kristina NS, "Final Office Action," issued for U.S. Appl. No. 13/048,178, filed Mar. 15, 2011, mailed on Dec. 8, 2011, Alexandria, VA.

Junge, Kristina NS, "Non-Final Office Action," issued for U.S. Appl. No. 12/777,591, filed May 11, 2010, mailed on Mar. 1, 2012, Alexandria, VA.

Junge, Kristina NS, "Non-Final Office Action," issued for U.S. Appl. No. 13/473,216, filed May 16, 2012, mailed on Feb. 21, 2013, Alexandria, VA.

Junge, Kristina NS, "Non-Final Office Action," issued for U.S. Appl. No. 13/473,216, filed May 16, 2012, mailed on Jul. 17, 2013, Alexandria, VA.

Staley, Kristina, "Non-Final Office Action," mailed on Jun. 28, 2011 for U.S. Appl. No. 13/048,178, filed Mar. 15, 2011, Alexandria, VA.

SYSTEM AND METHOD FOR MOUNTING A BADGE ON A VEHICLE

CROSS-REFERENCE TO RELATED APPLICATIONS

This application is a continuation of U.S. patent application Ser. No. 13/473,216, filed May 16, 2012, which is a continuation of U.S. patent application Ser. No. 12/777,591, filed May 11, 2010, now U.S. Pat. No. 8,181,372, which are hereby incorporated by reference in their entirety.

BACKGROUND OF THE INVENTION

The present invention relates to a badge assembly; more particularly, the present invention relates to a system and method for mounting a badge assembly on a grill or other component of a motorized or non-motorized vehicle without the need for tools.

It is common for a motor enthusiast to attach one or more badges to his or her vehicle to display indicia representing a country of origin, an affiliation with a motoring group, a slogan, the make or model of the vehicle, or another type of symbol. Typically, badges are mounted to the grill of a vehicle so that they can be seen by someone viewing the front of the vehicle.

Existing systems for mounting a badge to a grill of a vehicle typically include a mounting base and a retaining member. The mounting base and retaining member are first attached to the grill, and then the badge is attached to the mounting base. However, existing systems for mounting a badge to the grill of a vehicle are problematic because it is difficult to attach the mounting base and retaining member to the grill.

In order to attach the mounting base and retaining member to the grill, the mounting base is placed adjacent to an outer surface of the grill, and then the retaining member is placed adjacent to an inner surface of the grill so the grill is positioned between the mounting base and the retainer member. Then one or more screws or bolts are used to draw the mounting base and the retaining member closer together so that both components are firmly in contact with the grill, wherein the heads of screws or bolts are positioned adjacent to the inner surface of the grill and are therefore accessible from behind the grill.

The difficultly lies in gaining access to the inner surface of the grill to properly align the retaining member with the mounting base so that the screws or bolts may pass through the retaining member and threadably engage the mounting base. Typically, the inner surface of the grill can be accessed by opening the hood of the vehicle or going through the engine compartment in some manner. Some vehicles have access to the inner surface of the grill by this manner, and some do not, which severely limits the variety of vehicles in which a badge can be mounted.

Even if access to the inner surface of the grill is gained by going through the engine compartment, it is still difficult to align the retaining member with the mounting base, while at the same time trying to thread the screws or bolts through the retaining member and mounting base using a tool that is being utilized behind the grill. The need to use tools in combination with the limited accessibility of the rear portion of the grill makes the attachment of a badge to a vehicle using existing systems inconvenient and time consuming. Existing badge mounting systems are also problematic because they do not include a reliable mechanism for preventing the badge from falling off during use or from being stolen.

Accordingly, there exists a need for a badge that can be easily and efficiently mounted to a grill of a vehicle. Further, there is a need for a system and method for mounting the badge to the grill of a vehicle without using tools. The present invention fills these needs as well as other needs.

BRIEF SUMMARY OF THE INVENTION

In order to overcome the above stated problems and limitations there is provided a system for mounting a badge to a component of a vehicle. The system comprises a mounting base including a fastening aperture defined therein, wherein the fastening aperture extends in a direction through a plane defined by the mounting base. The mounting base further includes a peripheral edge. The system also includes a trim ring coupled with the peripheral edge of the mounting base. The trim ring has an opening defined therein and is configured to selectively mount the badge between the trim ring and the mounting base when the trim ring is coupled with the peripheral edge of the mounting base so that the badge is positioned within the opening in the trim ring. The system also comprises a flexible fastening member including a first end and a second end, wherein the first end is fixedly coupled with the mounting base and the second end is configured to be positioned within the fastening aperture. The first end of the flexible fastening member may be fixedly coupled with the mounting base by a screw, cold mold, or other type of fastening mechanism. The flexible fastening member is configured to be positioned around at least a portion of the component of the vehicle, and positioned between the mounting base and the badge to fasten the badge to the vehicle.

The mounting base in the system may further include a first side and a second side, wherein the first end of the flexible fastening member is fixedly coupled with the second side of the mounting base. At least one post may extend outwardly from the first side of the mounting base, and the second end of the flexible fastening member may have at least one post aperture defined therein that is configured to receive the at least one post.

The badge in the system may further include a first layer and a second layer, wherein the first layer has an indicia cut-out portion defined therein and is positioned within the opening in the trim ring. The second layer may be positioned between the first layer and the mounting base so that the second layer is visible through the indicia cut-out portion.

The system may further include a magnetic layer and a metal base plate, wherein the magnetic layer is positioned between the badge and the metal base plate, and wherein the metal base plate is positioned between the magnetic layer and the mounting base.

The trim ring in the system may be threadably coupled with the mounting base. The trim ring may also be hingedly coupled with the mounting base, in which case the system further comprises at least one fastener and wherein the trim ring has at least one aperture defined therein configured to receive the at least one fastener. The at least one fastener may be configured to engage the mounting base to couple the trim ring to the mounting base.

The system may include a plurality of fasteners, wherein the trim ring and the mounting base each have a plurality of corresponding apertures defined therein. In this instance, each of the plurality of corresponding apertures defined in the trim ring and the mounting base are configured to receive one of the plurality of fasteners to couple the trim ring to the mounting base.

In another aspect, a badge mounting system may comprise a badge, a mounting base, a trim ring, and a flexible fastening member. The mounting base includes a fastening aperture defined therein that extends in a direction through a plane defined by the mounting base. The mounting base includes a peripheral edge and may be a separate component relative to the badge. The trim ring is coupled with the peripheral edge of the mounting base and has an opening defined therein. The trim ring is configured to selectively mount the badge between the trim ring and the mounting base when the trim ring is coupled with the mounting base so that the badge is positioned within the opening in the trim ring. The flexible fastening member includes a first end and a second end, wherein the first end is fixedly coupled with the mounting base, and the second end is configured to be positioned within the fastening aperture. The flexible fastening member is configured to be positioned around an object, and is positioned between the mounting base and the badge to fasten the badge to the object.

In yet another aspect, a badge mounting system may comprise a badge, a mounting base including a fastening aperture defined therein, a trim ring coupled with the mounting base, a base plate, and a flexible fastening member. The trim ring has an opening defined therein and is configured to selectively mount the badge between the trim ring and the mounting base when the trim ring is coupled with the mounting base so that the badge is positioned within the opening in the trim ring. The base plate has an aperture defined therein and is positioned between the badge and the mounting base. The flexible fastening member includes a first end that is fixedly coupled with the mounting base, and a second end is configured to be positioned within the fastening aperture. The fastening member is configured to be positioned around an object and positioned between the mounting base and the badge.

Additional objects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Figure 1:
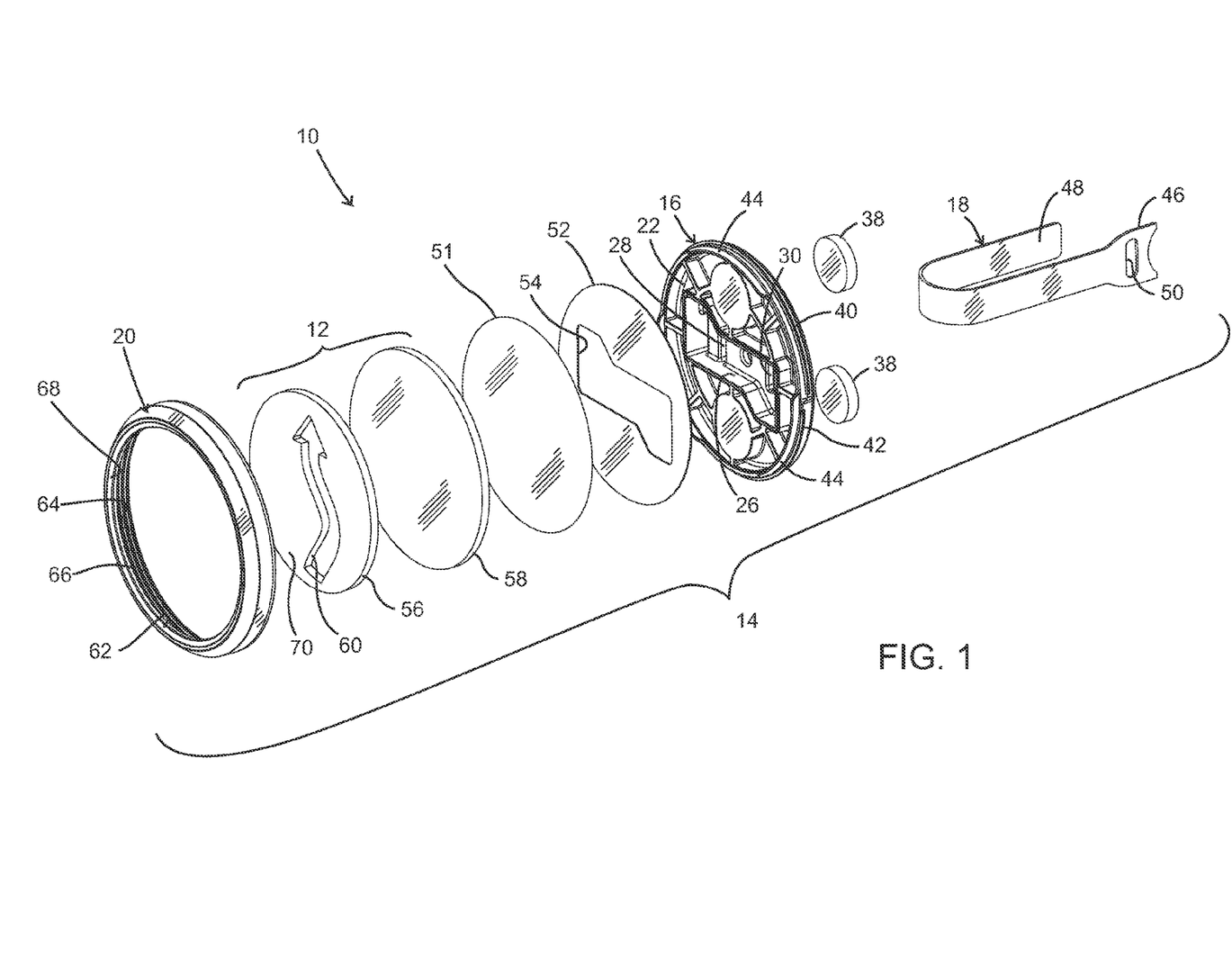
FIG. 1 is a front exploded view of a badge assembly in accordance with the present invention.
Figure 2:
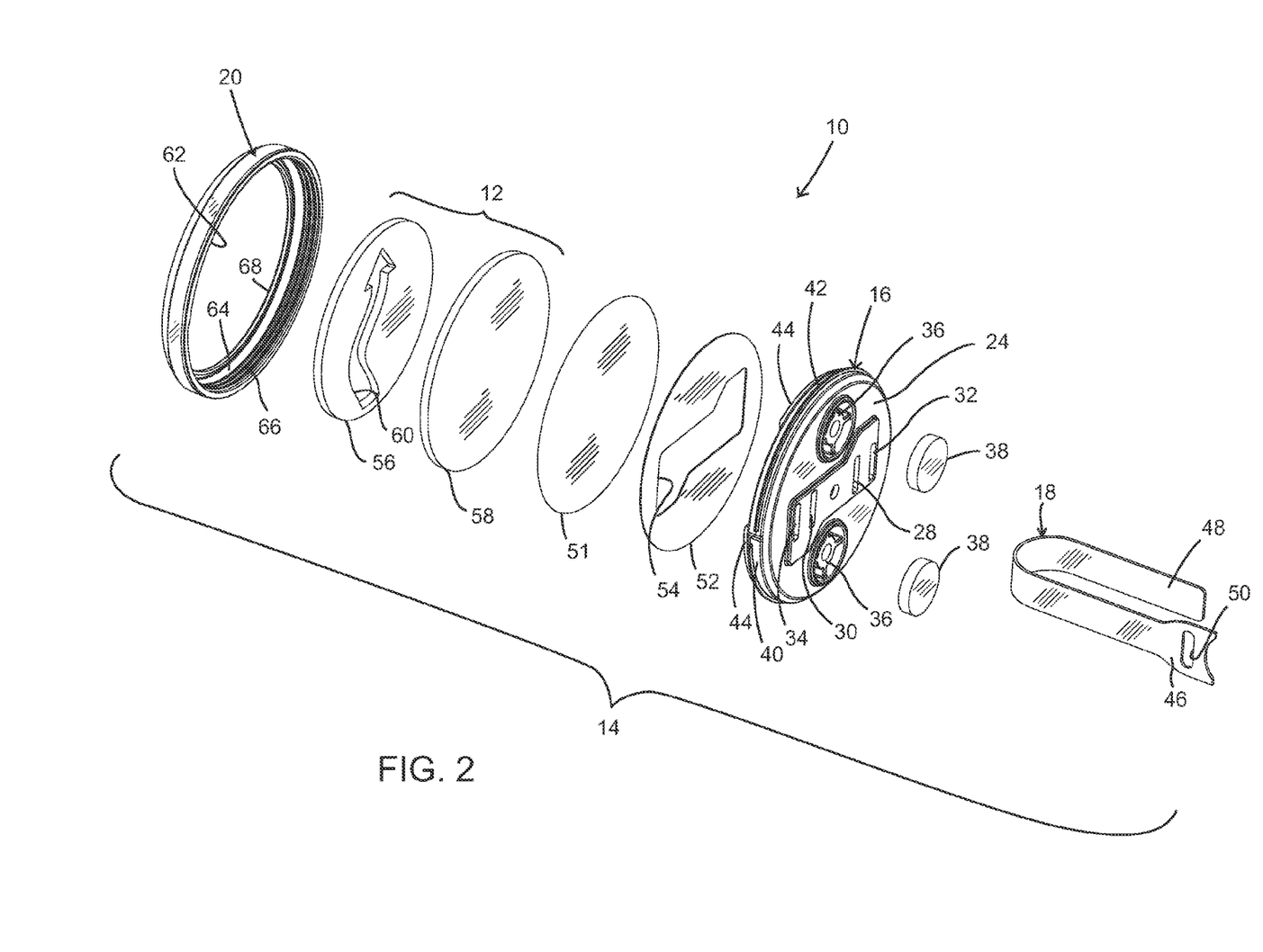
FIG. 2 is a rear exploded view of the badge assembly shown in FIG. 1.
Figure 3:
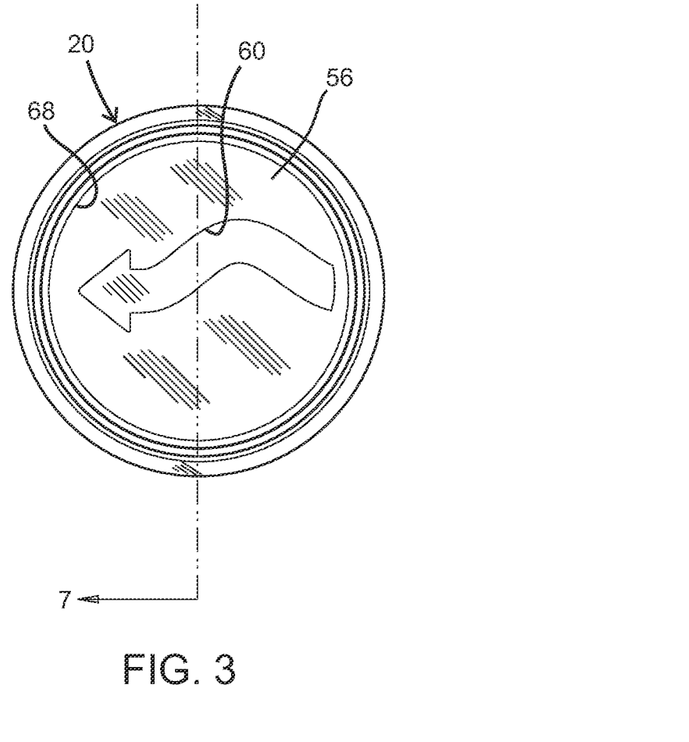
FIG. 3 is a front view of the badge assembly shown in FIG. 1.
Figure 4:
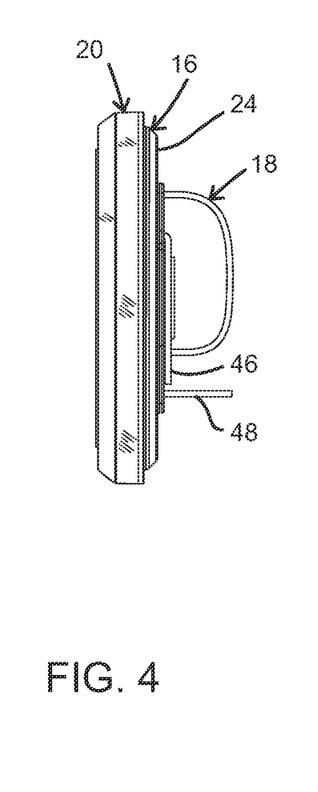
FIG. 4 is a right side view of the badge assembly shown in FIG. 1.
Figure 5:
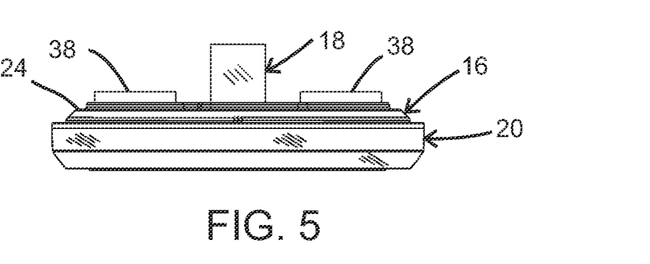
FIG. 5 is a top view of the badge assembly shown in FIG. 1.
Figure 6:
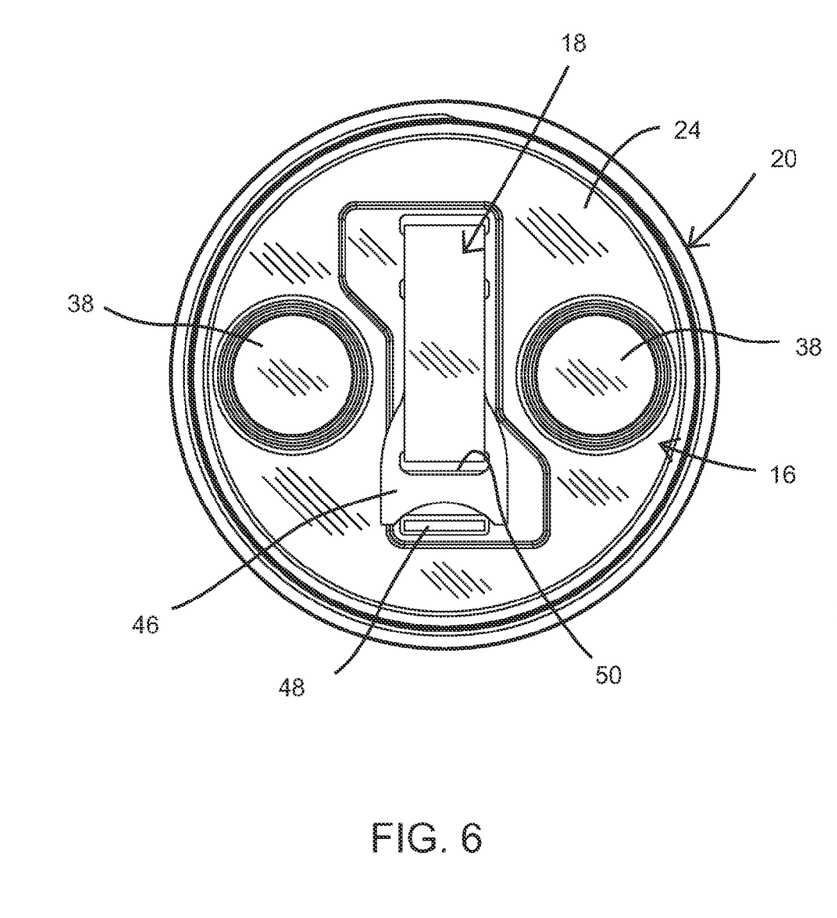
FIG. 6 is a rear view of the badge assembly shown in FIG. 1.
Figure 7:
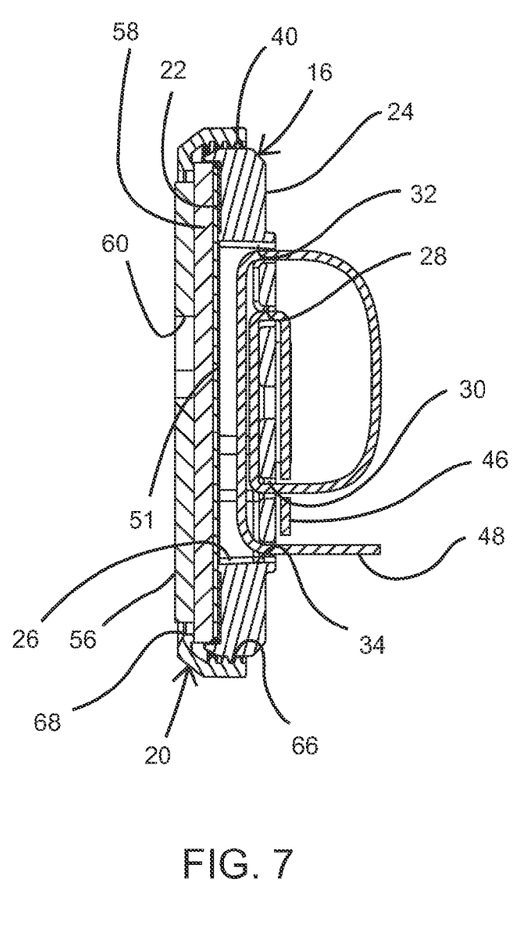
FIG. 7 is a cross-sectional view of the badge assembly taken along line 7-7 in FIG. 3.

Referring now to the drawings in detail, and initially to FIGS. 1 and 2, reference numeral 10 generally designates a system for mounting a badge 12 to a component of a vehicle, such as a grill of an automobile, in accordance with a first aspect of the present invention. The system 10 and badge 12 are collectively referred to herein as the badge assembly 14. It should be understood that the use of the term "vehicle" shall be construed to include any motorized or non-motorized vehicle including, but not limited to, a car, truck, motorcycle, bicycle, trailer, snowmobile, snowboard, car rack, and the like.

In general, one aspect of the present invention comprises badge assembly 14, which includes a mounting base 16 that is securably fastened to the vehicle component using a flexible fastening member 18. The badge 12 is placed on mounting base 16, and a trim ring 20 is coupled with mounting base 16 to securably fasten badge 12 between trim ring 20 and mounting base 16.

As best seen in FIGS. 1, 2 and 4-7, mounting base 16 includes a first side 22 and a second side 24, wherein first side 22 has a recess 26 defined therein. Four separate fastening apertures 28, 30, 32, 34 may be defined in recess 26. All four of the fastening apertures 28, 30, 32, 34 extend to second side 24 of mounting base 16. First and second fastening apertures 28, 30 may be disposed between third and fourth fastening apertures 32, 34. On second side 24 of mounting base 16, one or more pad recesses 36 are defined therein and configured to accept a corresponding number of pads 38. Pads 38 are positioned on second side 24 so that they will contact the vehicle component to stabilize badge assembly 14 when fastened to the vehicle. A peripheral edge 40 of mounting base 16 may be threaded so that trim ring 20 can be threadably coupled with mounting base 16. Mounting base 16 may further include one or more locator ridges 44 that extend outwardly from first side 22 that assists in properly positioning badge 12 on mounting base 16.

Badge assembly 14 further includes flexible fastening member 18 that is configured to be positioned within one or more of four apertures 28, 30, 32, 34. Flexible fastening member 18 may be a strap, cord or any other fastening member that will operate to provide the desired flexibility to wrap around the vehicle component and the strength to attach mounting base 16 to the vehicle. Flexible fastening member 18 may be formed of a hook and loop material, an elastomeric material, or any other material that achieves the objective described herein. Flexible fastening member 18 may include a first end 46 and a second end 48, wherein first end 46 has an aperture 50 defined therein configured for receiving second end 48 of flexible fastening member 18.

Badge 12 may be positioned directly on first side 22 of mounting base 16 to cover recess 26, wherein badge 12 is positioned on mounting base 16 using locator ridges 44. Alternatively, badge 12 may have a magnetic layer 51 coupled thereto, and a metal base plate 52 may be mounted to first side 22 of mounting base 16, as best seen in FIGS. 1 and 2, wherein metal base plate 52 has an aperture 54 defined therein. The use of magnetic layer 51 and metal base plate 52 enables badge 12 to be coupled to mounting base 16 prior to the attachment of trim ring 20 to mounting base 16.

Badge 12 may either be a single layer or a multi-layered construction including a plurality of layers positioned on top of one another as best seen in FIGS. 1, 2, 3 and 7. For example, multi-layered badge 12 may include a badge graphic layer 56 and a badge base layer 58, wherein badge graphic layer 56 may have an indicia cut-out portion 60 defined therein. Badge graphic layer 56 is positioned within an opening 62 defined in trim ring 20. Badge base layer 58 is positioned between badge graphic layer 56 and mounting base 16 so that badge base layer 58 is visible through indicia cut-out portion 60. It should be understood that indicia cut-out portion 60 may take the form of any shape, symbol, letter or number. In addition, first and second layers 56, 58 may be formed of the same or different materials, formed of the same or different colors, and formed of translucent, transparent or opaque materials. In addition, mounting base 16 may optionally include a LED or LCD back light positioned within recess 26 so that badge 12 can be lit up when the vehicle is in operation or at desired time intervals.

As best seen in FIGS. 1-7, trim ring 20 is configured to be coupled with mounting base 16 to securably mount badge 12 between trim ring 20 and mounting base 16, wherein badge 12 is positioned within opening 62 in trim ring 20. Trim ring 20 includes an inner surface 64 defining opening 62, wherein inner surface 64 includes threads 66 that are configured to mesh with threads 42 disposed on mounting base 16 to fasten trim ring 20 to mounting base 16. Opening 62 may also include a retaining ridge 68 that is configured to contact an outer surface 70 of badge 12 to secure badge 12 against mounting base 16 when trim ring 20 is coupled with mounting base 16, and to prevent badge 12 from falling out of opening 62. The present invention may also include a cap dome (not shown) that is coupled to the trim ring 20 that covers opening 62 to shield badge 12 from damage.

Figure 8:
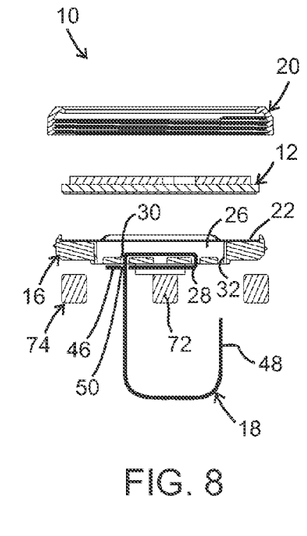
FIG. 8 is an illustration of a step in a method of mounting the badge assembly to a grill of a vehicle.
Figure 9:
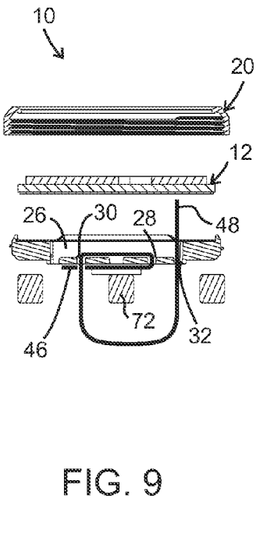
FIG. 9 is an illustration of a step in the method of mounting the badge assembly to the grill of the vehicle that follows the step shown in FIG. 8.
Figure 10:
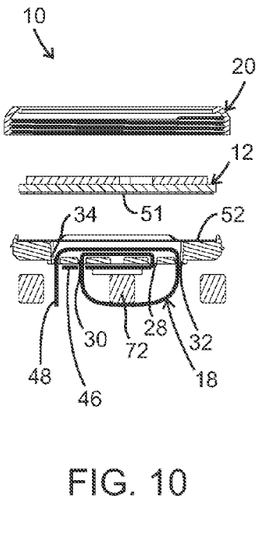
FIG. 10 is an illustration of a step in the method of mounting the badge assembly to the grill of the vehicle that follows the step shown in FIGS. 9.
Figure 11:
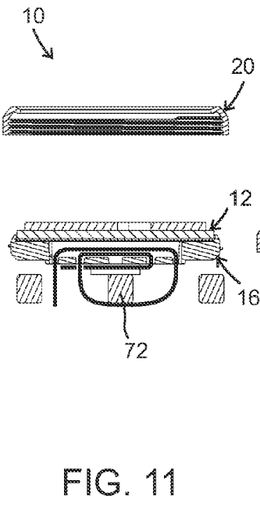
FIG. 11 is an illustration of a step in the method of mounting the badge assembly to the grill of the vehicle that follows the step shown in FIG. 10.
Figure 12:
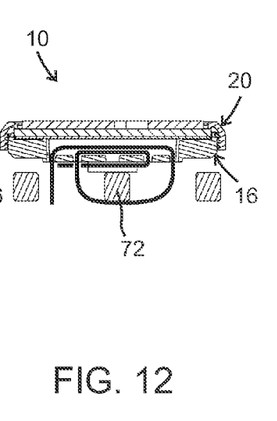
FIG. 12 is an illustration of a step in the method of mounting the badge assembly to the grill of the vehicle that follows the step shown in FIG. 11.

FIGS. 8-12 are a sequence of drawings showing one method of mounting badge assembly 14 to a grill 72 of a vehicle 74. According to the method, as best seen in FIG. 8, first end 46 of flexible fastening member 18 is positioned adjacent to second side 24 of mounting base 16 so that aperture 50 is aligned with second fastening aperture 30. Next, second end 48 of flexible fastening member 18 is inserted into first fastening aperture 28 and into recess 26 on first side 22 of mounting base 16. Second side 24 of mounting base 16 may then be positioned against grill 72 so that flexible fastening member 18 is positioned between grill 72 and mounting base 16. Second end 48 of flexible fastening member 18 is then inserted into second fastening aperture 30 and through aperture 50 defined in first end 46 of flexible fastening member 18 as best seen in FIG. 8. As best seen in FIG. 9, second end 48 of flexible fastening member 18 is then wrapped around at least a portion of grill 72 and inserted into third fastening aperture 32 so that second end 48 of flexible fastening member 18 is positioned in recess 26 on first side 22 of mounting base 16. Tension may then be applied to second end 48 to draw mounting base 16 against grill 72. Alternatively, instead of inserting second end 48 of flexible fastening member 18 into third fastening aperture 32, second end 48 could be inserted into first fastening aperture 28. At this point, second end 48 of flexible fastening member 18 may be positioned within recess 26 on first side 22 of mounting base 16, badge 12, and magnetic layer 51, if used, may be positioned on top of mounting base 16 to mechanically trap flexible fastening member 18 within recess 26, and then trim ring 20 may be coupled with mounting base 16 to complete the mounting of badge assembly 14 to vehicle 74. However, second end 48 of flexible fastening member 18 may also be inserted into fourth fastening aperture 34 (FIG. 10), or back through second fastening aperture 30, prior to placement of badge 12, magnetic layer 51, if used, and attachment of trim ring 20 to mounting base 16, as best seen in FIGS. 11 and 12.

Figure 13:
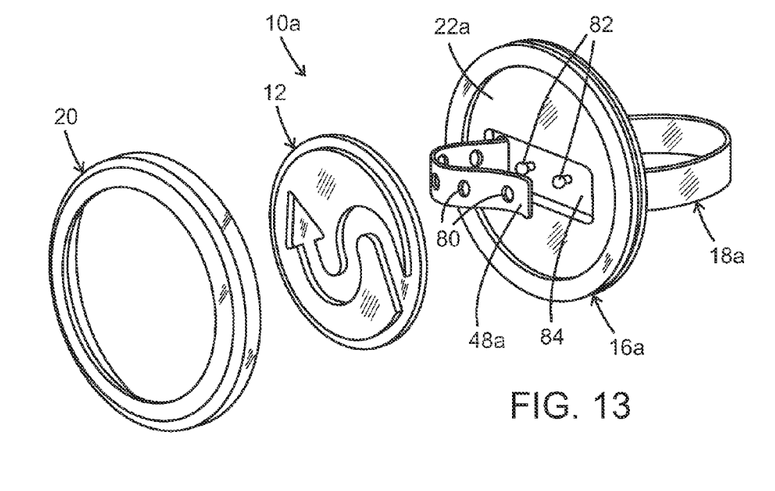
FIG. 13 is a front exploded view showing another system for attaching a mounting base to a component of a vehicle.
Figure 14:
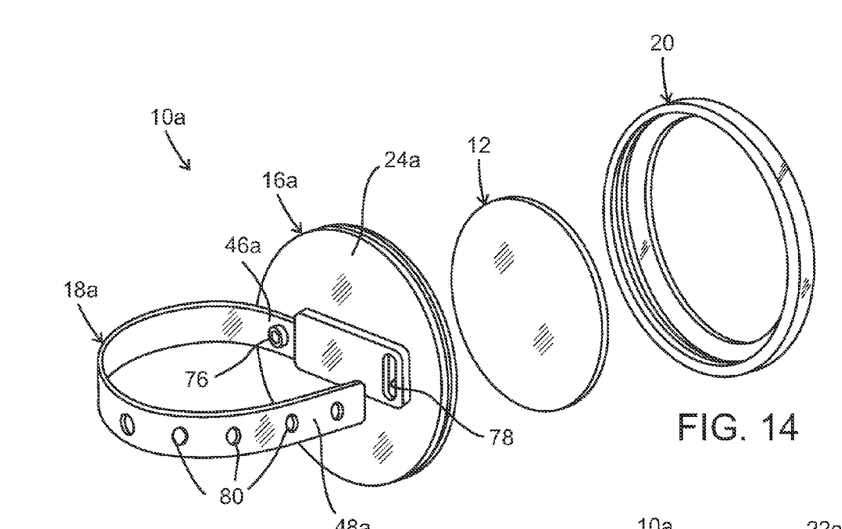
FIG. 14 is a rear exploded view of the system shown in FIG. 13.

As best seen in FIGS. 13 and 14, the present invention includes an alternative badge assembly 10a including mounting base 16a and flexible fastening member 18a for attaching badge 12 to a vehicle. It should be understood that badge 12 and trim ring 20 are similar to those described above with respect to FIGS. 1-7, and need not be discussed in further detail. As best seen in FIG. 14, a first end 46a of flexible fastening member 18a is fixedly coupled to a second side 24a of mounting base 16a using a screw, cold mold, or other type of fastening mechanism 76. A second end 48a of flexible fastening member 18a is configured to be positioned within a fastening aperture 78 defined in mounting base 16a, wherein fastening aperture 78 extends in a direction through a plane defined by mounting base 16a. Flexible fastening member 18a has at least one post aperture 80 defined therein that are configured to receive one or more posts 82 that extend outwardly from a surface 84 on a first side 22a of mounting base 16a. Flexible fastening member 18a is configured to be wrapped around at least a portion of a component of a vehicle and fed through fastening aperture 78 so that one or more posts 82 can be inserted into at least one aperture 80 to securely fasten mounting base 16a to the vehicle.

Figures 15, 16:
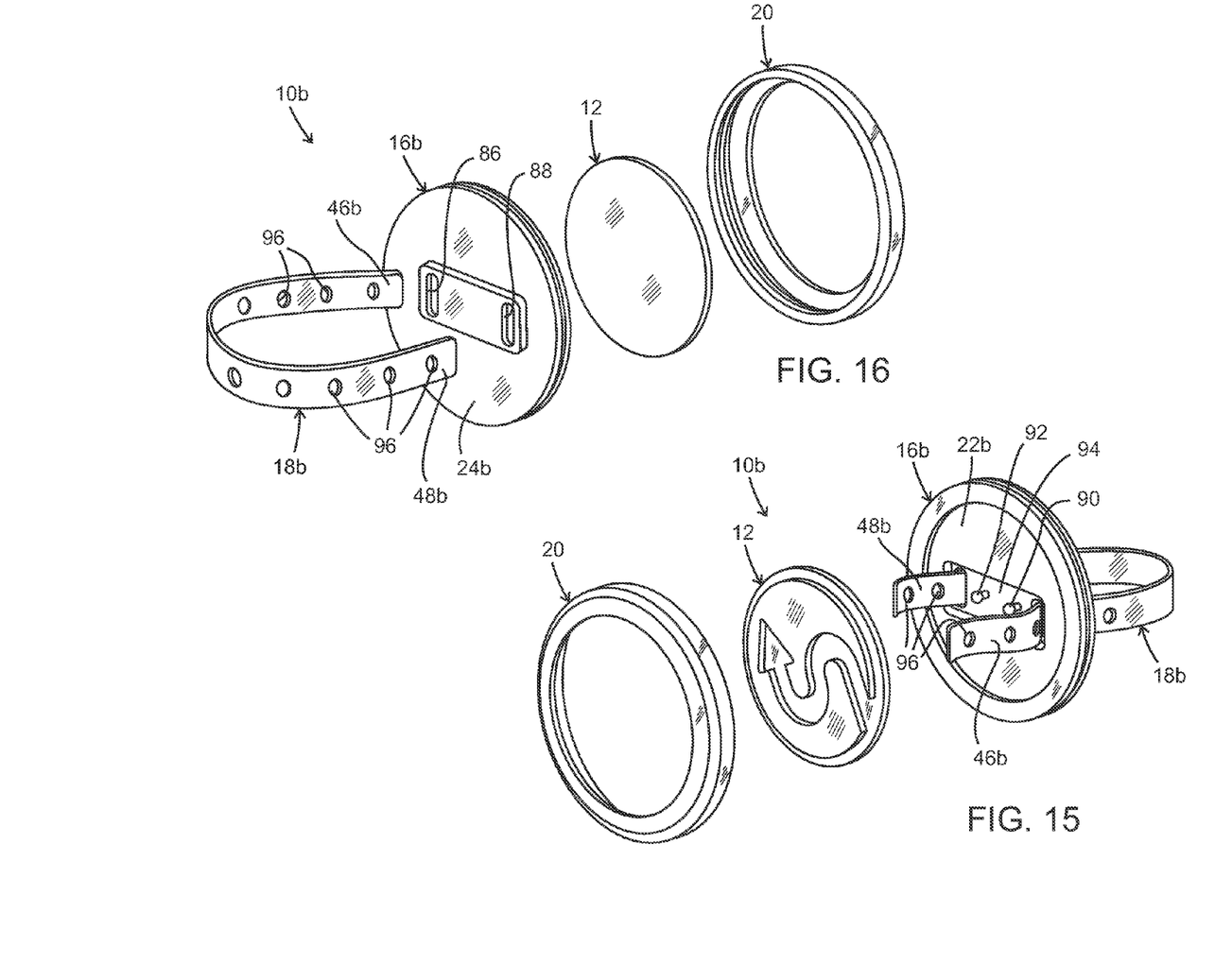
FIG. 15 is a front exploded view showing yet another system for attaching the mounting base to a component of a vehicle.
FIG. 16 is a rear exploded view of the system shown in FIG. 15.

As best seen in FIGS. 15 and 16, the present invention includes another alternative badge assembly 10b including mounting base 16b and flexible fastening member 18b for attaching badge 12 to a vehicle. It should be understood that badge 12 and trim ring 20 are similar to those described above with respect to FIGS. 1-7, and need not be discussed in further detail. As best seen in FIG. 16, mounting base 16b includes first and second fastening apertures 86, 88 defined therein, and first and second posts 90, 92 extending from a surface 94 on a first side 22b of mounting base 16b. Flexible fastening member 18b includes first and second ends 46b, 48b that are configured to be positioned within first and second fastening apertures 86, 88, respectively. Flexible fastening member 18b further includes a plurality of apertures 96 defined therein configured to receive first and second posts 90, 92 so that mounting base 16b may be mounted to a vehicle component. For example, in attaching mounting base 16b to the vehicle component, flexible fastening member 18b is first wrapped around a vehicle component, first and second ends 46b, 48b are then positioned within first and second fastening apertures 86, 88, respectively, so that first and second ends 46b, 48b are positioned on first side 22b of mounting base 16b. First end 46b is then fastened to mounting base 16b by inserting one or more of posts 90, 92 into respective apertures 96 in flexible fastening member 18b, and second end 48b is fastened to mounting base 16b by inserting one or more of posts 90, 92 into respective apertures 96 in flexible fastening member 18b so that mounting base 16b is securely attached to the vehicle component. While FIG. 15 shows that mounting base 16b includes first and second posts 90, 92, it should be understood that flexible fastening member 18b may be attached to mounting base 16b using one post or more than two posts.

Figure 17:
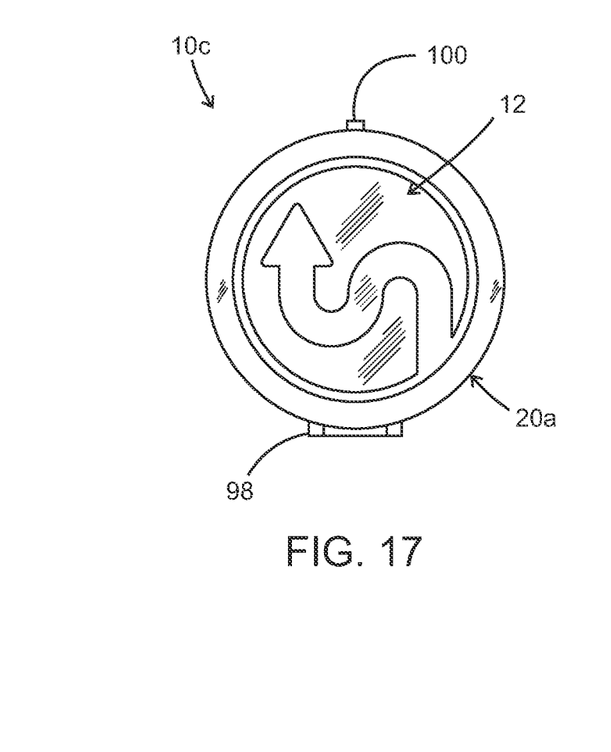
FIG. 17 is a front view of a badge assembly showing another way to secure a badge between a trim ring and a mounting base.
Figure 18:
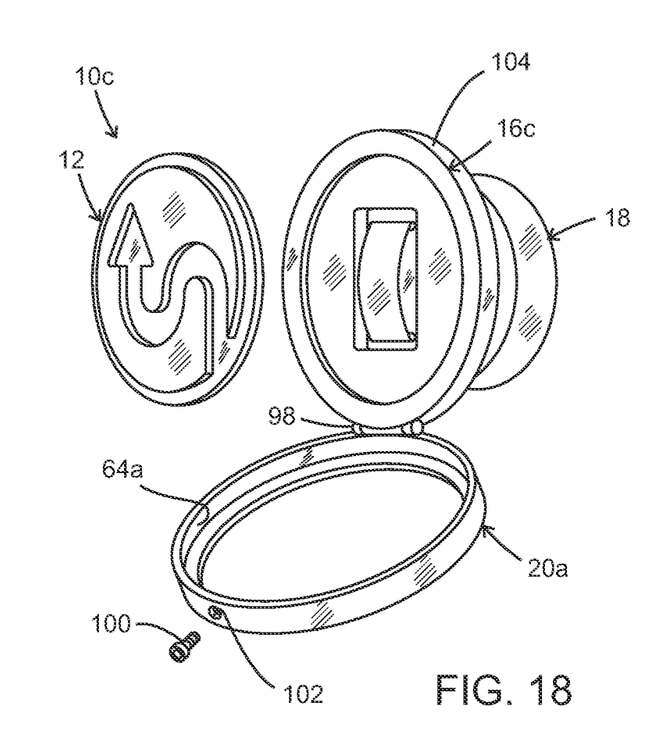
FIG. 18 is a partially exploded view of the motoring badge assembly shown in FIG. 17.

As best seen in FIGS. 17 and 18, the present invention includes an alternative badge assembly 10c including a trim ring 20a for securely fastening badge 12 to a mounting base 16c. In this aspect of the invention, trim ring 20a is coupled with mounting base 16c using a hinge 98. Badge 12 is placed against mounting base 16c, trim ring 20a is then pivoted relative to mounting base 16c so that badge 12 is positioned between trim ring 20a and mounting base 16c. Assembly 10c may further include a fastener 100, for example, a screw, that is positioned within an aperture 102 defined in trim ring 20a, wherein fastener 100 is configured to engage an outer surface 104, or a corresponding aperture (no shown) formed in outer surface 104, to fasten trim ring 20a to mounting base 16c. It should be understood that trim ring 20a may include a plurality of apertures defined in outer surface 104 that are configured to receive a plurality of fasteners to secure trim ring 20a to mounting base 16c. Trim ring 20a may also include a snap protrusion (not shown) extending from its inner surface 64a that is configured to engage mounting base 16c to prevent trim ring 20a from inadvertently swinging open and releasing badge 12.

Figure 19:
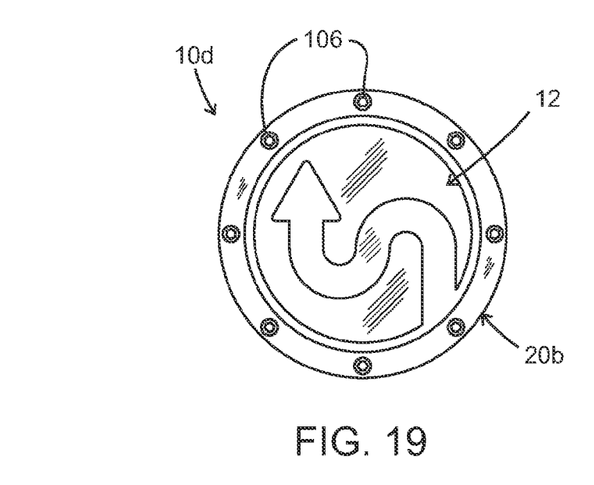
FIG. 19 is a front view of a badge assembly yet another way to secure a badge between a trim ring and a mounting base.
Figure 20:
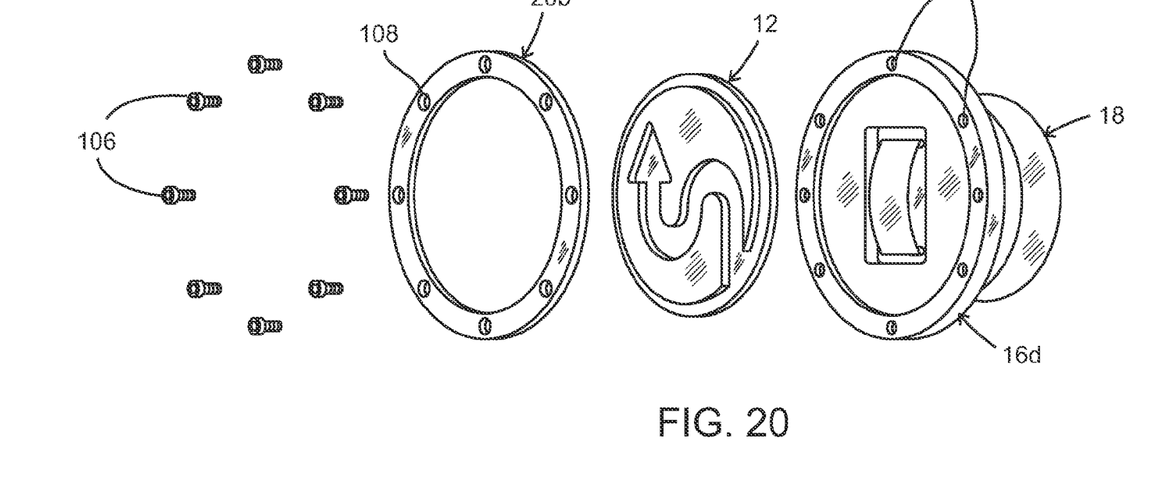
FIG. 20 is a partially exploded view of the badge assembly shown in FIG. 19.

As best seen in FIGS. 19 and 20, the present invention includes an another alternative badge assembly 10d including a trim ring 20b for securely fastening badge 12 to a mounting base 16d. In this aspect of the invention, a plurality of fasteners 106 are provided along with a corresponding number of apertures 108, 110 defined in a trim ring 20b and mounting base 16d. Badge 12 is first placed against mounting base 16d, and trim ring 20b is positioned over badge 12 so that apertures 108 are aligned with apertures 110. Fasteners 106 are then positioned within apertures 108, 110 and tightened so that trim ring 20b is drawn closer to mounting base 16d to securely fasten badge 12 to mounting base 16d.

The badge assembly system described above provides a number of advantages and improvements relative to existing badge assembly systems. For example, the present invention provides a badge assembly system that uses a flexible fastening member that is capable of attaching a badge to a vehicle component that is oriented in a horizontal direction, a vertical direction, or any other direction. The badge assembly system can also be mounted from the front a vehicle with no tools due in part to the use of the flexible fastening member and the configuration of the mounting base, as described above. By positioning the flexible fastening member between the badge and the mounting base, the flexible fastening member is trapped therebetween thereby securely fastening the badge assembly to the vehicle. This is in contrast with existing badge assembly systems that require the removal of a grill of a vehicle and the use of tools to securely fasten the badge assembly from the rear portion of the grill, which is time consuming and inconvenient. Furthermore, the use of a trim ring that securely fastens the badge to a mounting base in the present invention is advantageous in that it reduces the probability that the badge will inadvertently fall off the mounting base or be stolen. The trim ring in the present invention also provides the option of using badges with different thicknesses.

Although the present invention has been described in considerable detail with reference to certain preferred versions thereof, other versions are possible. Therefore, the spirit and scope of the appended claims should not be limited to the description of the preferred versions contained herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A system for mounting a badge to a component of a vehicle, said system comprising:
    a mounting base including a fastening aperture defined therein, said fastening aperture extending in a direction through a plane defined by said mounting base, said mounting base including a peripheral edge;
    a trim ring coupled with said peripheral edge of said mounting base, said trim ring having an opening defined therein, said trim ring is configured to selectively mount the badge between said trim ring and said mounting base when said trim ring is coupled with said peripheral edge of said mounting base so that the badge is positioned within said opening in said trim ring; and
    a flexible fastening member including a first end and a second end, wherein said first end is fixedly coupled with said mounting base, wherein said second end is configured to be positioned within said fastening aperture, wherein said flexible fastening member is configured to be positioned around at least a portion of the component of the vehicle, and wherein said flexible fastening member is configured to be positioned between said mounting base and the badge to fasten the badge to the vehicle.

2. A system in accordance with claim 1, wherein said first end of said flexible fastening member is fixedly coupled with said mounting base by a screw or cold mold.

3. A system in accordance with claim 1, wherein said mounting base includes a first side and a second side, and wherein said first end of said flexible fastening member is fixedly coupled with said second side of said mounting base.

4. A system in accordance with claim 3, further comprising at least one post extending outwardly from said first side of said mounting base, wherein said second end of said flexible fastening member has at least one post aperture defined therein, and wherein said at least one post aperture is configured to receive said at least one post.

5. A system in accordance with claim 1, wherein said flexible fastening member is one of a strap or a cord.

6. A system in accordance with claim 5, wherein said flexible fastening member is formed of at least one of a hook and loop material and an elastomeric material.

7. A system in accordance with claim 1, wherein the badge includes a first layer and a second layer, said first layer having an indicia cut-out portion defined therein, said first layer positioned within said opening in said trim ring, said second layer positioned between said first layer and said mounting base so that said second layer is visible through said indicia cut-out portion.

8. A system in accordance with claim 1, further comprising a magnetic layer and a metal base plate, wherein said magnetic layer is positioned between the badge and said metal base plate, and wherein said metal base plate is positioned between said magnetic layer and said mounting base.

9. A system in accordance with claim 1, wherein said trim ring includes threads that are configured for being coupled with matching threads on formed in said peripheral edge of said mounting base.

10. A system in accordance with claim 1, wherein said trim ring is hingedly coupled with said mounting base, wherein said system further comprises at least one fastener, wherein said trim ring has at least one aperture defined therein configured to receive said at least one fastener, and wherein said at least one fastener is configured to engage said mounting base to couple said trim ring to said mounting base.

11. A system in accordance with claim 1, further comprising a plurality of fasteners, wherein said trim ring and said mounting base each have a plurality of corresponding apertures defined therein, and wherein each of said plurality of corresponding apertures defined in said trim ring and said mounting base are configured to receive one of said plurality of fasteners to couple said trim ring to said mounting base, wherein said apertures defined in said trim ring are accessible through a front surface of said trim ring.

12. A badge mounting system comprising:
 a badge;
 a mounting base including a fastening aperture defined therein, said fastening aperture extending in a direction through a plane defined by said mounting base, wherein said mounting base includes a peripheral edge, wherein said mounting base is a separate component relative to said badge;
 a trim ring coupled with said peripheral edge of said mounting base, said trim ring having an opening defined therein, said trim ring is configured to selectively mount said badge between said trim ring and said mounting base when said trim ring is coupled with said mounting base so that said badge is positioned within said opening in said trim ring; and
 a flexible fastening member including a first end and a second end, wherein said first end is fixedly coupled with said mounting base, wherein said second end is configured to be positioned within said fastening aperture, wherein said flexible fastening member is configured to be positioned around an object, and wherein said flexible fastening member is configured to be positioned between said mounting base and said badge to fasten said badge to said object.

13. A system in accordance with claim 12, wherein said first end of said flexible fastening member is fixedly coupled with said mounting base by a screw or cold mold.

14. A system in accordance with claim 12, wherein said mounting base includes a first side and a second side, and wherein said first end of said flexible fastening member is fixedly coupled with said second side of said mounting base.

15. A system in accordance with claim 14, further comprising at least one post extending outwardly from said first side of said mounting base, wherein said second end of said flexible fastening member has at least one post aperture defined therein, and wherein said at least one post aperture is configured to receive said at least one post.

16. A system in accordance with claim 12, wherein said flexible fastening member is one of a strap or a cord.

17. A system in accordance with claim 16, wherein said flexible fastening member is formed of at least one of a hook and loop material and an elastomeric material.

18. A system in accordance with claim 12, wherein said badge includes a first layer and a second layer, said first layer having an indicia cut-out portion defined therein, said first layer positioned within said opening in said trim ring, said second layer positioned between said first layer and said mounting base so that said second layer is visible through said indicia cut-out portion.

19. A system in accordance with claim 12, further comprising a magnetic layer and a metal base plate, wherein said magnetic layer is positioned between said badge and said metal base plate, and wherein said metal base plate is positioned between said magnetic layer and said mounting base.

20. A system in accordance with claim 12, wherein said trim ring includes threads that are configured for being coupled with matching threads formed in a peripheral edge of said mounting base.

21. A system in accordance with claim 12, wherein said trim ring is hingedly coupled with said mounting base, wherein said system further comprises at least one fastener, wherein said trim ring has at least one aperture defined therein configured to receive said at least one fastener, and wherein said at least one fastener is configured to engage said mounting base to couple said trim ring to said mounting base.

22. A system in accordance with claim 12, further comprising a plurality of fasteners, wherein said trim ring and said mounting base each have a plurality of corresponding apertures defined therein, and wherein each of said plurality of corresponding apertures defined in said trim ring and said mounting base are configured to receive one of said plurality of fasteners to couple said trim ring to said mounting base, wherein said apertures defined in said trim ring are accessible through a front surface of said trim ring.

23. A badge mounting system comprising:
 a badge;
 a mounting base including a fastening aperture defined therein;
 a trim ring coupled with said mounting base, said trim ring having an opening defined therein, wherein said trim ring is configured to selectively mount said badge between said trim ring and said mounting base when said trim ring is coupled with said mounting base so that said badge is positioned within said opening in said trim ring;
 a base plate having an aperture defined therein, wherein said base plate is positioned between said badge and said mounting base; and
 a flexible fastening member including a first end and a second end, wherein said first end is fixedly coupled with said mounting base, wherein said second end is configured to be positioned within said fastening aperture, wherein said flexible fastening member is configured to be positioned around an object, and wherein said flexible fastening member is configured to be positioned between said mounting base and said badge.

24. A system in accordance with claim 23, further comprising a magnetic layer, wherein said base plate is a metal base plate, wherein said magnetic layer is positioned between said badge and said metal base plate, and wherein said metal base plate is positioned between said magnetic layer and said mounting base.

* * * * *